D. W. CLARK.
T-Coupling.

No. 227,148. Patented May 4, 1880.

Witnesses:
E. M. Curtis.
H. M. Clark

Inventor:
D. W. Clark.

United States Patent Office.

DAVID W. CLARK, OF TIDIOUTE, PENNSYLVANIA.

T-COUPLING.

SPECIFICATION forming part of Letters Patent No. 227,148, dated May 4, 1880.

Application filed November 8, 1879.

*To all whom it may concern:*

Be it known that I, DAVID W. CLARK, of Tidioute, in the county of Warren and State of Pennsylvania, have invented a T-Coupling, of which the following is a specification, reference being had to the accompanying drawings, in which—

Figure 1:
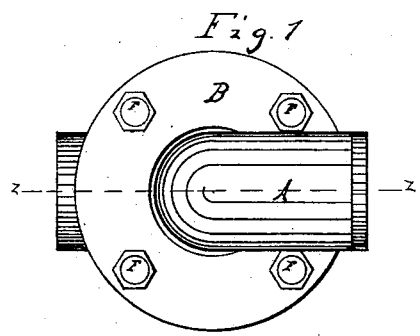
Figure 2:
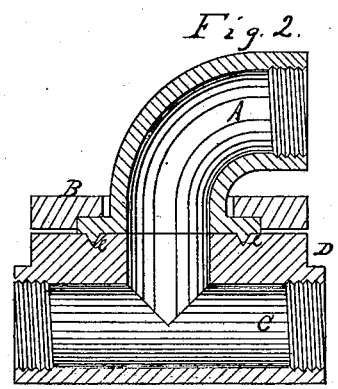
Figure 3:
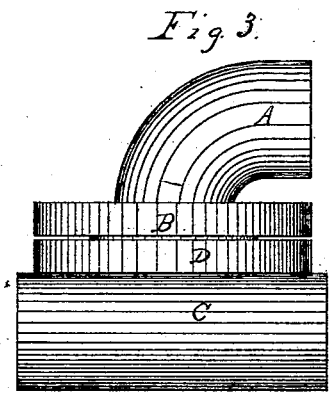
Figure 4:
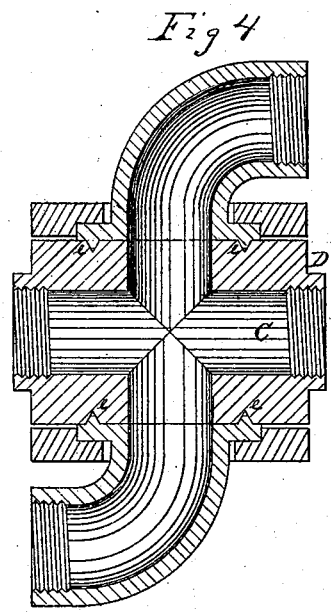

Figure 1 is a plan of a T-coupling constructed according to my invention. Fig. 2 is a sectional elevation of the same on line z z, Fig. 1. Fig. 3 is a side view of my T with coupling attached. Fig. 4 is a sectional elevation of a double T or cross, showing my improvement on both sides of the T.

Similar letters of reference indicate corresponding parts.

The object of this invention is to provide a coupling that shall admit of the direct attaching of one line of pipe to that of another, each running parallel or in different directions, thereby saving the expense of extra couplings, bending of pipe, &c.

Previous to my invention, when an iron branch pipe had to be connected at an angle to another line, it was necessary to bend the pipe to meet the angle, or else to introduce a nipple and elbow, together with an ordinary coupling, or a coupling with angular or curved elbows, between the pipe and the T. The first plan is difficult, and the last two are expensive and objectionable, as they require extra fittings and add to the number of joints, thereby increasing the liability of leakage.

To overcome this difficulty I provide the ordinary T or cross with a flange or flanges on one or more of its sides, a corresponding plate or plates, and a flanged elbow or elbows, which may either be curved, as in the drawings, or may be straight, but set at any angle desired with the flange. By this combination I dispense with the trouble and expense of bending pipe or the extra fittings required under the old plan.

As it is sometimes necessary to turn the elbow, I make a V or tapering projection on the face of the flange of the elbow and a corresponding recess in the flange of the T, thus dispensing with the ordinary packing.

In the drawings, Fig. 2, A represents a flanged elbow; B, a circular plate, with a recess on the inner edge; C, the T; D, a circular plate or flange cast onto C, to which the flanged elbow A and plate B are held firmly together by suitable bolts and nuts. A flanged nut might be used in place of bolts and plate B.

e represents a tapering projection on flange of elbow, said projection fitting into a groove of corresponding shape in plate or flange D, and held firmly in said groove by means of plate B and bolts F. By this style of packing the elbows can be turned in any direction required without loosening the bolts and without causing the joints to leak.

The position of the projection and groove may be reversed, making the groove in flange of elbow and the projection on plate or flange D.

Should the projection E become damaged in any way, thereby causing the joint to leak, soft packing may be placed in the groove.

The coupling serves as an elbow for pipe and for uniting different lines of pipe.

A screw-thread may be cut on the inside or outside the elbows, or they may be made without it, as desired.

What I claim as new is—

1. The combination of the flanged elbow A, the circular plate B, and the T or cross C, provided with the flange D, substantially as described.

2. The combination of the tapering projection e on elbow-flange and the groove in plate or flange D, substantially as described.

DAVID W. CLARK.

Witnesses:
E. M. CURTIS,
G. H. M. CLARK.